United States Patent [19]
Smart et al.

[11] Patent Number: 5,967,735
[45] Date of Patent: Oct. 19, 1999

[54] LOADING AND RECOVERY APPARATUS

[75] Inventors: Leslie Smart; Gary MacQueen, both of New Albany, Mich.

[73] Assignee: Krause Plow Corporation, Hutchinson, Kans.

[21] Appl. No.: 08/741,294

[22] Filed: Oct. 30, 1996

Related U.S. Application Data

[63] Continuation of application No. 08/365,711, Dec. 28, 1994, abandoned.

[51] Int. Cl.$^6$ ............................................. B60P 1/48
[52] U.S. Cl. ...................... 414/498; 193/37; 193/35 C; 414/492; 414/529; 414/500; 414/546
[58] Field of Search .................... 414/498, 499, 414/500, 546, 501, 529, 530, 531, 532, 533, 534, 535, 536, 555, 559, 569, 276, 491, 492, 493, 494; 193/35 R, 35 C, 37; 254/3 R, 8 R

[56] References Cited

U.S. PATENT DOCUMENTS

| | | |
|---|---|---|
| 2,550,230 | 4/1951 | Dalton . |
| 2,745,566 | 5/1956 | Bouffard . |
| 2,889,945 | 6/1959 | Holsclaw ........................... 193/37 X |
| 2,983,352 | 5/1961 | De Flora et al. ...................... 193/35 R |
| 3,080,034 | 3/1963 | Homes ........................ 193/37 |
| 3,819,075 | 6/1974 | Derain . |
| 3,869,031 | 3/1975 | Coleman et al. ...................... 193/35 R |
| 3,874,537 | 4/1975 | Kou . |
| 3,878,947 | 4/1975 | Corompt . |
| 3,892,323 | 7/1975 | Corompt . |
| 3,942,664 | 3/1976 | Lemarie . |
| 3,944,095 | 3/1976 | Brown . |
| 3,957,166 | 5/1976 | Durham . |
| 3,964,625 | 6/1976 | Wirz . |
| 3,988,035 | 10/1976 | Corompt . |
| 4,111,321 | 9/1978 | Webster . |
| 4,175,904 | 11/1979 | Airaksinen . |
| 4,422,543 | 12/1983 | Stubbings ........................ 193/35 C X |
| 4,456,418 | 6/1984 | Hart et al. ........................ 193/35 C X |
| 4,755,098 | 7/1988 | Wulf et al. . |
| 4,902,189 | 2/1990 | Raisio ................................ 414/529 X |
| 5,007,792 | 4/1991 | Wiedeck et al. . |
| 5,082,417 | 1/1992 | Vlaanderen ....................... 414/531 X |
| 5,108,247 | 4/1992 | Vlaanderen . |

FOREIGN PATENT DOCUMENTS

| | | |
|---|---|---|
| 564403 | 10/1993 | European Pat. Off. ............... 414/491 |
| 2595303 | 9/1987 | France . |
| 2628060 | 1/1977 | Germany . |
| 60-166539 | 8/1985 | Japan . |
| 61-081831 | 4/1986 | Japan . |
| 960103 | 9/1982 | U.S.S.R. ................................. 193/37 |
| 1397329 | 5/1988 | U.S.S.R. . |
| 1234147 | 6/1971 | United Kingdom ................... 414/492 |
| 2135658 | 9/1984 | United Kingdom . |

OTHER PUBLICATIONS

*604 ML.* 6–page brochure, American Hooklift, undated.
*610 MLS.* 2–page brochure, American Hooklift, Jun. 1992.
*618 MLS.* 6–page brochure, Vulcan Equipment Company, undated.

(List continued on next page.)

*Primary Examiner*—Frank E. Werner
*Attorney, Agent, or Firm*—Niro, Scavone, Haller & Niro

[57] ABSTRACT

An improved multi-function loading and recovery apparatus for use with pallets, flat racks, containers and the like having a simple, effective design while enabling efficient operation in a wide variety of recovery operations. This multi-function loading and recovery apparatus utilizes a double pivoting tilt frame and self-locking L-arm, and also includes a unique inside-outside rail option, a collapsible bumper, forward-mounted rollers, an improved rear stabilizer and other features.

10 Claims, 12 Drawing Sheets

OTHER PUBLICATIONS

*Vulcan 618 MLS System*, 4–page brochure, Vulcan Equipment Company, Dec. 1990.
*The "Truck Saver" (Fuel Saver)* Solution, 2–page brochure, Vulcan Equipment Company, undated.
*Multilift Hooklift HL–19*, 4–page brochure, Multilift, a Cargotec Company, undated.
*Multi Lift Quick–Change Body Systems*, 4–page brochure, Cargotec, Inc., undated.
*Multi Lift Quick–Change Body Systems*, 6–page brochure, Cargotec, Inc., undated.
*Stellar Shuttle, The Stellar Shuttle Trailer*, 4–page brochure, Stellar Industries, Inc., undated.
*Stellar Shuttle, The Stellar Shuttle System*, 6–page brochure, Stellar Industries, Inc., undated.
*Stellar Shuttle*, 4–page brochure, "52,000 lb. Capacity Now Available from Stellar," Stellar Industries, Inc., undated.
*It All Starts Here . . . With Swaploader*, 8–page brochure regarding swapping truck bodies quickly and easily, Swaploader Ampliroll Container Adapter, specification sheet, Marrell Corporation, one page undated.
The Versatile Ampliroll "the Hook", Model 75 LL, one page of promotional photographs, Marrell Corporation.

The Versatile Ampliroll "the Hook", Model 100, two–page promotional specification sheet, Marrel Corporation.

The Versatile Ampliroll "the Hook", Model 75S and 75L, two–page promotional specification sheet, Marrel Corporation.

The Versatile Ampliroll "the Hook", Model 140/1400, two–page promotional specification sheet, Marrel Corporation.

Bennes Marrel, Marrel's Ampliroll: A Versatile Solution, Models 35, 75, 100, 140, 160, 180, 6–page promotional.

Rudco Scorpion Hook Hoist (8,000 Lbs. Capacity), Promotional and specification sheet, 4–pages, Rudco Products, Inc.,.

Rudco Scorpion Hook Hoist (12,000 Lbs. Capacity), Promotional and specification sheet, 2–pages, Rudco Products, Inc.,.

Rudco Roll–Off Hoist (60,000 Lbs. Capacity), Promotional and specification sheet, 2–pages, Rudco Products, Inc.,.

Rudco Roll–Off Hoist Inside–Outside Rail (75,000 Lbs. Capacity), Promotional and specification sheet, 2–pages, Rudco.

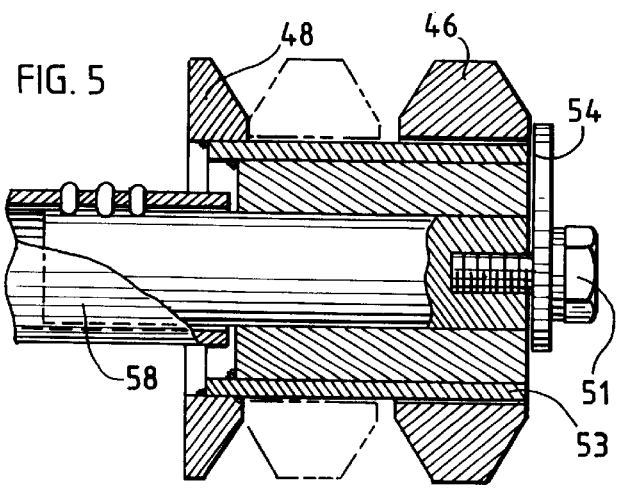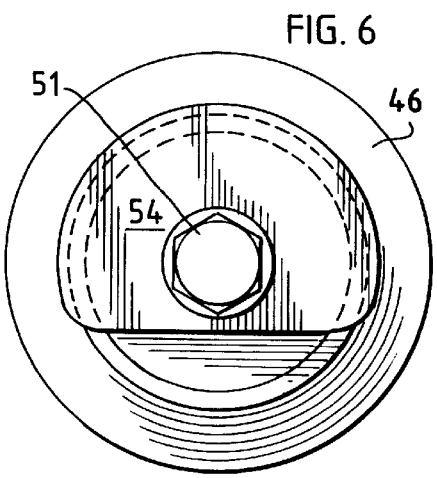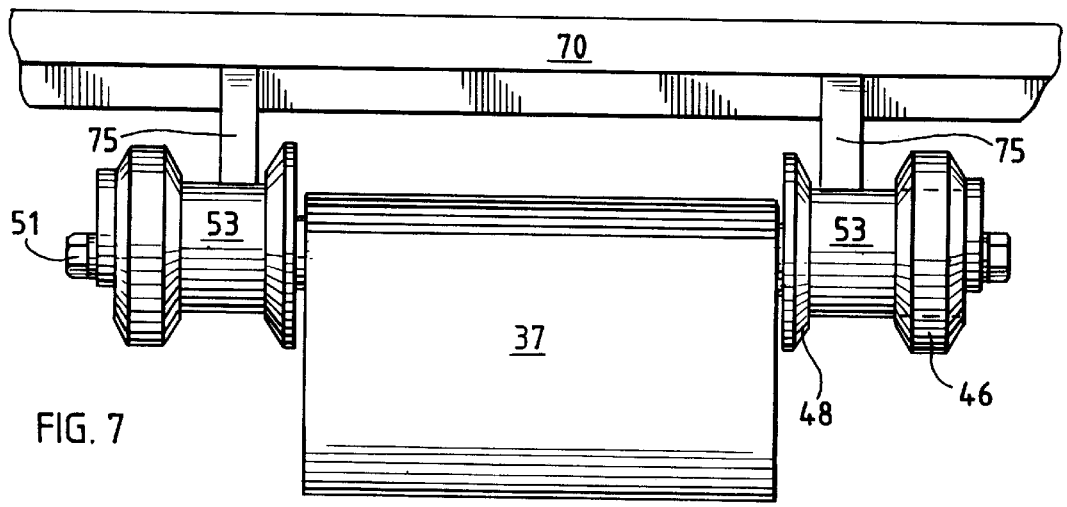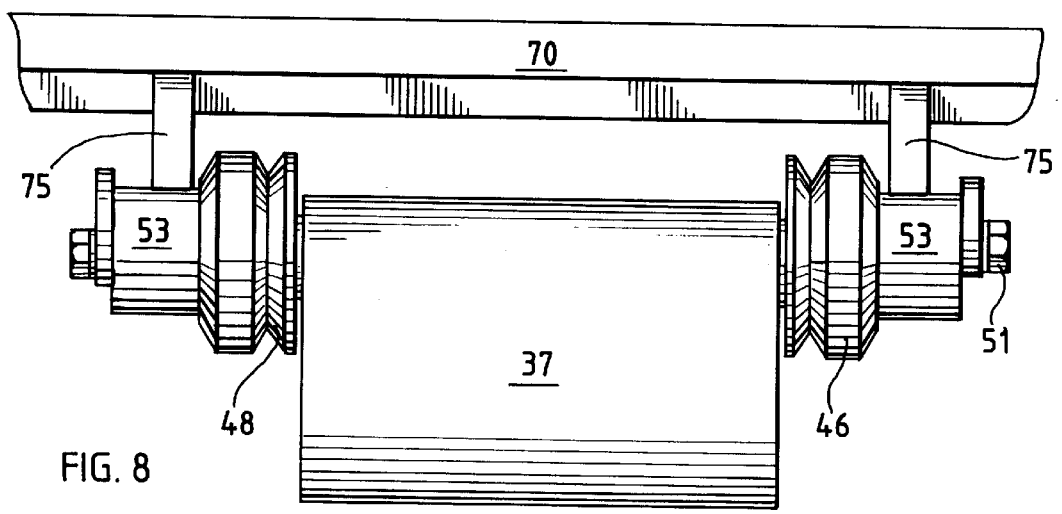

LOADING AND RECOVERY APPARATUS

This application is a continuation of application Ser. No. 08/365,711 filed Dec. 28, 1994 now abandoned.

BACKGROUND OF THE INVENTION

The present invention relates generally to a multi-function loading and recovery apparatus. More particularly, it relates to an improved loading and recovery apparatus capable of multiple uses, such as use with both "inside" and "outside" rail containers, and that is easy and efficient to operate in a wide variety of loading, unloading, dumping and recovery applications.

There are a variety of known pallet or container loading devices which have the ability to serve a dumping function. However, these known devices suffer from a number of disadvantages because of their design and construction. Generally, the known devices have complicated arm or boom assemblies necessary to achieve their designated functions. And because of their complicated arm or boom assemblies, the known devices are higher priced, require increased maintenance, require high pressure hydraulic systems to accommodate extreme load weights, and are more difficult to operate. Further, while such conventional devices may also utilize a tiltable frame, these devices typically require a distinct third member, such as metal hooks, to connect the arm or boom assembly to the tiltable frame, in order to lift the tiltable frame.

Another disadvantage in prior art loading devices is the requirement that the load, such as a pallet, to be recovered or loaded must be of a length longer than the hoist itself. This requirement is a severe limitation on the use of the loading device when the precise sized pallet or load is not available or practical. Therefore, it is also desirable to have a loading or recovery device that can accommodate a wide range of loads and pallets and still be able to operate in a dumping mode.

U.S. Pat. No. 5,290,138 ("the '138 patent"), owned by the same assignee as the present invention, and hereby incorporated by reference into this disclosure, describes an improved loading and recovery apparatus which solves the problems mentioned above. This apparatus includes an L-arm which can both retract or extend, and which can also be locked to a tiltable frame to permit rotation of the arm and frame structure, as one unified piece, while the L-Arm is in a partially retracted or fully extended position. This gives the apparatus greater flexibility, and permits it to be used with containers having less narrowly constrained lengths.

While the device disclosed in the '138 patent has proven to be successful, there are certain disadvantages still associated with it, and room for further improvements, as disclosed here. For example, there is still a need for a loading and recovery apparatus which can recover and dump both "inside" and "outside" container rails. "Outside"container rail dimensions are typically 36½ inches ID and 40 inches OD, while "inside" rail dimensions are typically 29½ inches ID and 33½ inches. These inner diameter rail dimensions are current industry standards (with an industry standard ½ inch gap to accommodate manufacturing tolerances). The outer diameter rail dimensions may be wider. Most of the roll-off containers in existence are "outside rail" types. All known hook lifts can dump only "outside rail" containers. Thus, there is a need for a hook lift that can recover and dump both inside and outside rail containers.

There is also a need for a loading and recovery apparatus with a bumper which can serve as a rearward extension of the vehicle chassis, yet which is collapsible to avoid acting as an obstruction during tilting and dumping. Thus, while the industry standard tilt frame length is about 18 feet, the standard container length is 22 feet, and some customers require the handling and dumping of containers up to 24 feet long. Applicable laws permit a two foot overhang throughout the U.S. and, in some cases, four feet, while a six foot overhang is not permitted. To avoid the expense of a longer chassis, while maintaining the operational advantage of a more maneuverable, shorter chassis a collapsible bumper of between two and four feet is therefore needed. Additionally, the use of such a bumper would avoid both the expense of a longer chassis or a longer hoist, and the problems associated with having to locate bumperettes on the containers or bodies.

Yet another disadvantage associated with known loading and recovery vehicles is the use of steel slide pads to hold the container or body rails in place during loading. The steel-steel interaction of the slide pads and the container rails ensures that the pads will wear. Further, even if a wear pad is bolted to the steel pad, the wear pads will still have to be periodically replaced. Also, if the container is not exactly at the right height when pulled up by the hook, the wear pads can be ripped out by the container rails.

A further disadvantage of prior art devices is their instability during all loading and dumping cycles. While the twin, chassis-mounted outboard cylinders disclosed in the '138 patent were a significant improvement in this regard, there is always a need for increased stability and safety.

It would also be advantageous to provide a rear stabilizer which permits heavier hoist loading, while being adaptable for use on both hard (concrete or asphalt) and soft (dirt, mud or sand) terrain.

It would also be advantageous to provide a stabilizer which permits the front end of the truck chassis to remain on the ground during the loading of heavy loads, or during the loading of pallets or containers which are excessively short, or unevenly loaded (i.e., that have more weight to the front than to the rear). This would not only increase the safety of the combined chassis and hoist, but would also permit safe loading in instances where the hoist would otherwise not be capable of picking up the load.

Further, it would be advantageous to locate the hinge point of the tipping frame and the lift cylinders so as to optimize both dumping and lifting capacity, while permitting both a dump angle of over 60° and the use of four or five rear axles. This last feature allows the vehicle to carry more legal weight, since state weight regulations are tied to the number of axles.

Yet another advantage would be the provision of a lifting and recovery vehicle which combines the following features within the physical envelope defined at the rear of the chassis frame, while being in non-interfering obstruction with portions of the vehicle such as the chassis differential, the axles, the brake chambers, and suspension parts, or the approach angle of the container body during loading: a rear hydraulic stabilizer, a rear hydraulic winch, a pintle hook, and a collapsible bumper.

Finally, it would be preferable to also retain all of the advantages and flexibility provided by the loading and recovery apparatus disclosed in the '138 patent.

SUMMARY OF THE INVENTION

In accordance with the present invention, an improved multi-function loading and recovery apparatus is provided which overcomes many of the problems associated with known devices, while at the same time preserving the beneficial features and advantages of such devices, including the advantages of the apparatus described in the '138 patent.

In the preferred embodiment of the present invention, an improved loading and recovery apparatus for loading and unloading container bodies is disclosed. The apparatus is operable from a rearward end of a recovery vehicle, and includes a rotatable structure, such as a hoist tilt frame pivotally mounted to the vehicle for supporting the container body. An extendable and retractable generally L-shaped arm is also preferably included, and is preferably pivotally connected to the rotatable structure. The apparatus can include a number of alternative, particularly preferred embodiments, including a rail cooperation mechanism, a collapsible bumper, a "forward" roller, an improved rear stabilizer, and other features now described. Additional features such as a winch or a pintle hook can also be included.

In one preferred embodiment, the rail cooperation mechanism is located on the rotatable structure and permits the rotatable structure to safely load and dump different container bodies having rails of varying spacing, while limiting side-to-side container body sway during handling. In a particularly preferred embodiment, the rail cooperation mechanism includes at least one stationary ring adjacent at least one movable ring. The stationary and movable rings are slidable along a roller located on the rotatable structure. The rings cooperate to fix the rail of the container body between the rings, and permit the rotatable structure to accommodate different container bodies having rails of varying spacing while limiting container body sway during handling.

In another preferred embodiment, a "forward" roller mechanism is disclosed. This may include one or more rollers mounted on opposing sides of the L-shaped arm. Alternatively, the rollers can be mounted to support structures such as a tilt frame, or be attached to the vehicle chassis or other locations. The rollers cooperate with the container body rails during handling, and facilitate slidable movement between the L-shaped arm and the container body rails. In a particularly preferred embodiment, a rotatable structure includes a tilt frame and a generally L-shaped arm, and the roller mechanism serves to decrease stress in the tilt frame during the handling of container bodies.

In still another preferred embodiment, a collapsible bumper or platform is disclosed which is also operable with the loading and recovery apparatus of the present invention. The platform is mounted to a rearward portion of the rotatable structure and automatically extends to form a rearward extension of the rotatable structure in response to a forward pivotal movement of the rotatable structure. The platform is collapsible in response to a rearward pivotal movement of the rotatable structure.

In yet another preferred embodiment, a stabilizer is disclosed which is mounted to the rear of the vehicle chassis. The stabilizer includes a substantially vertical frame and a downwardly extending shoe or foot. The foot is located beneath the frame and is powered by an actuating cylinder for vertical movement. The frame is preferably oriented in substantially the same plane as the actuating cylinder.

These and other objects and advantages of the present invention will become apparent to those skilled in the art from a reading of the following detailed description of the preferred embodiments and the appended claims.

BRIEF DESCRIPTION OF THE DRAWINGS

Various features, objects and advantages of the present invention will become apparent from the following description and drawings wherein like reference numerals represent like elements in the several views, and in which:

FIG. 5 is a rear cross-sectional view taken along section lines 5—5 of FIG. 2 showing the rear roller assembly including the inside-outside rail option of the present invention;

FIG. 6 is a side view taken along section lines 6—6 of FIG. 2 showing a moveable ring;

FIGS. 7 and 8 are alternative end views taken along section lines 7—7 and 8—8 of FIG. 2 showing use of the inside-outside rail option for both inside rail and outside rail containers, respectively;

DETAILED DESCRIPTION OF THE PREFERRED EMBODIMENTS

Figure 1:
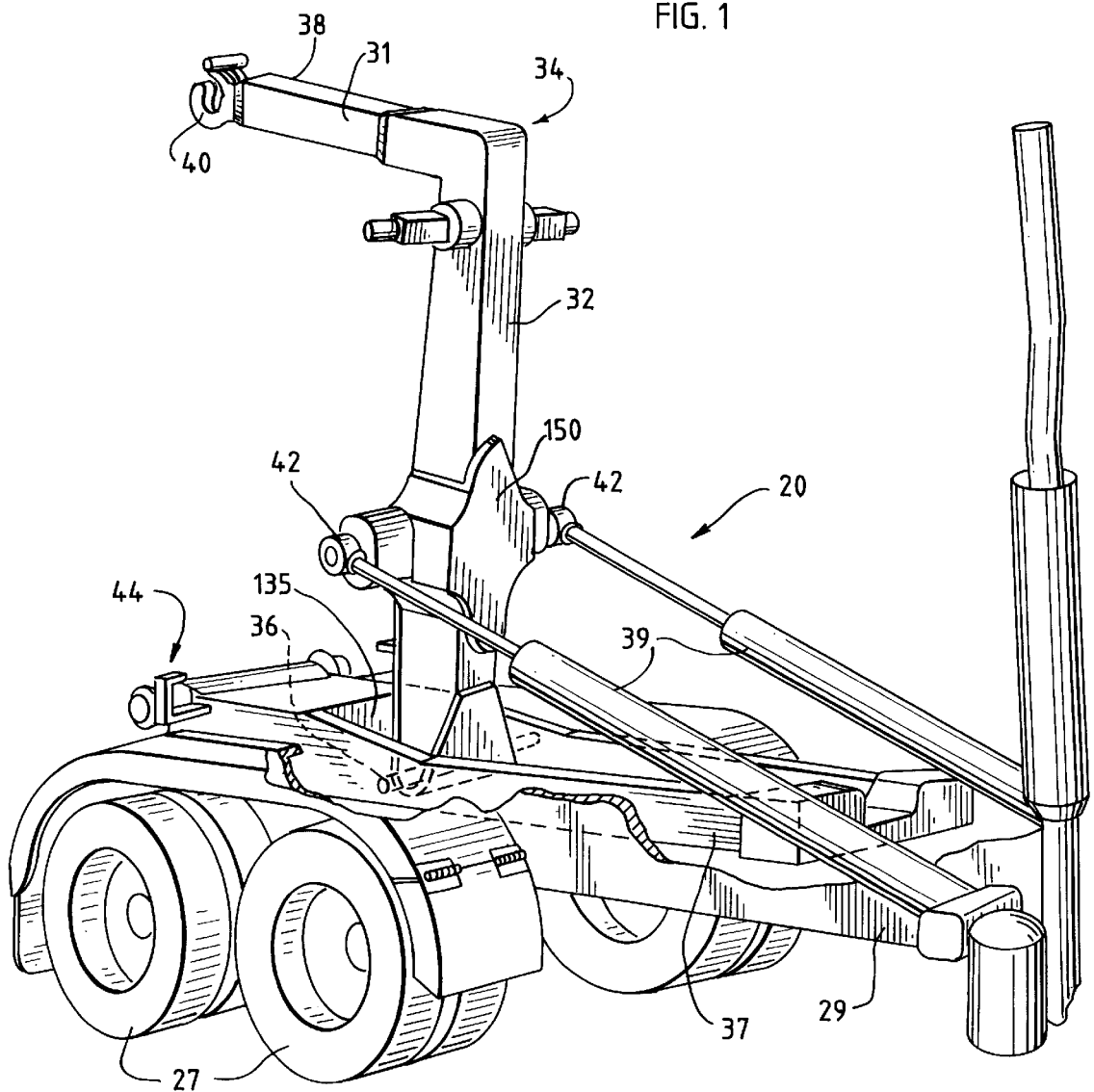
FIG. 1 is a side perspective view of the loading apparatus of the present invention, illustrating the partial extension of the lifting cylinders to rotate the L-arm.

The multi-function loading and recovery apparatus of the present invention is shown generally as 20 in FIG. 1.

Apparatus 20 is conventionally used with a recovery vehicle 26 having a cab 28 and a frame or chassis 29. Recovery vehicle 26 also has front wheels (not shown) and rear wheels 27.

In the disclosed embodiment of the present invention shown in the drawings the loading and recovery apparatus includes a dual beam tilt frame mounted on the chassis, an L-Arm that is both extendible and retractable, and means for locking the L-Arm and the tilting frame such that the L-Arm and the tilt frame can be maintained together in a fixed position through a range of L-Arm movement, with the locking means being engageable when the L-Arm is in any extended position (except fully retracted). The L-Arm further includes a wide stabilizing frame for added support and balance of the pallet during loading and unloading.

More specifically, FIG. 1 shows apparatus 20 of the present invention mounted onto chassis 29 of vehicle 26. Twin outboard lifting cylinders 39 are mounted to opposing sides of chassis 29 for rotating an L-Arm, designated generally as 34. Outboard cylinders 39 may be forwardly mounted to cylinder baskets (not shown) which can be mounted below chassis 29. As shown at FIG. 1, outboard cylinders 39 can be rearwardly mounted to opposite sides of hammerhead-shaped plate 150 on outer boom 32. It is preferred to provide two outboard cylinders for broad-based and balanced lifting action of the entire loading apparatus. L-arm 34 is pivotally connected at pivot end 36 to an intermediate portion of a rotatable support structure, such as tilt frame 37, at a location generally forward of the centerline of rear wheels 27. Lifting cylinders 39 are pivotally connected at a rearward end 42 positioned at an intermediate location on the outer boom 32 intermediate boom 33 of L-arm 34. A forward end (not shown) of lifting cylinders 39 is pivotally connected to a generally forward portion of chassis 29. Throughout the specification, reference is made to the front or forward, and rear or rearward positions. As used herein, front or forward refers to a direction toward the cab 28 of recovery vehicle 26 and rear or rearward refers to a direction toward the rear wheels 27 of recovery vehicle 26.

Referring again to FIG. 1, one L-arm embodiment is shown utilizing a two-stage boom. L-Arm 34 has a pivot end 36 attached to an intermediate portion of tilt frame 37, and a free end 38. Dual beam tilt frame 37 provides support to L-arm 34 during loading and dumping. Outer boom 32 is generally horizontal and parallel to frame 29 when in the load carrying or fully retracted position. L-Arm 34 includes an inner boom 31, an intermediate boom 33, and an outer boom 32. Outer boom 32 can be L-shaped while inner boom 31 can be straight (as shown in FIG. 1). Conversely, inner boom 31 can be L-shaped and outer boom 32 can be straight. The forward end of inner boom 31 slidably engages within intermediate boom 33 to provide a telescoping action. Various conventional means, such as cylinders (not shown), may be employed to actuate inner boom 31 within intermediate boom 33, or to actuate booms 31 and 33 within outer boom 32.

Figure 2:
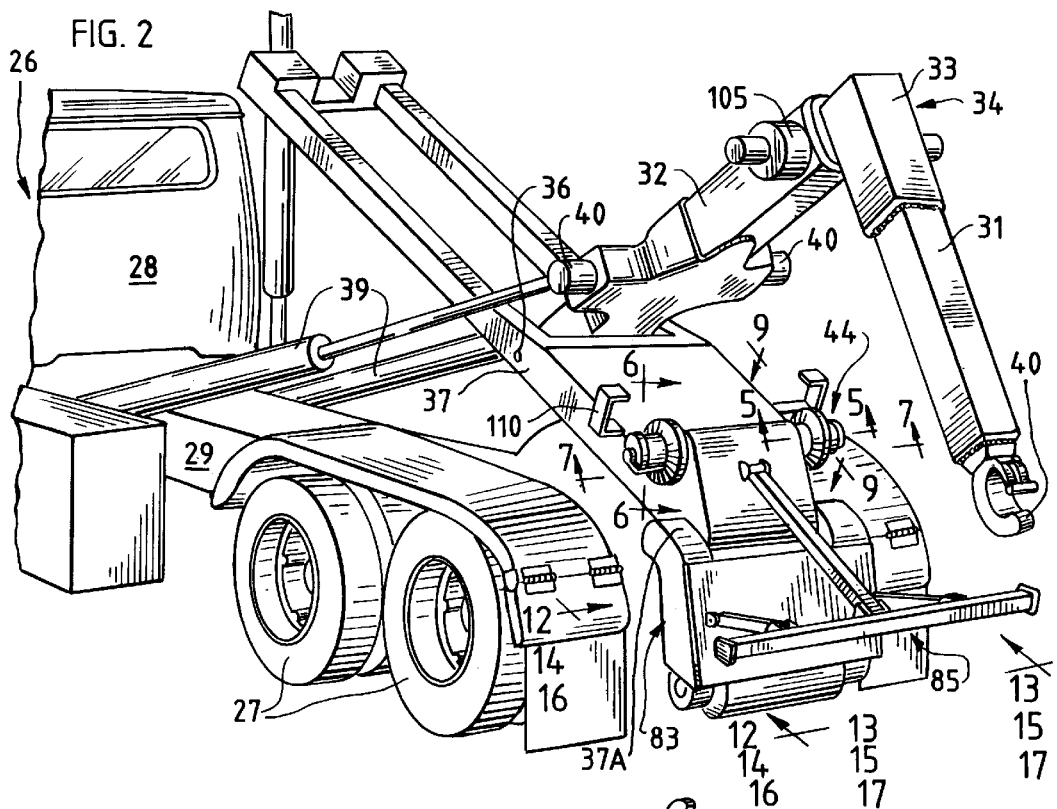
FIG. 2 is a rear perspective view of the loading apparatus in the pallet loading mode, illustrating the extension of the lifting cylinders causing the tilt frame to raise off the truck chassis.

Alternatively, as shown in FIG. 2, L-arm 34 can consist of a three-stage boom, having one or two hydraulic cylinders (not shown) located within outer boom 32 and intermediate boom 33 (and ultimately connected to inner boom 31), for extending and retracting inner boom 31 within intermediate boom 33, and intermediate boom 33 within outer boom 32. The extension cylinders could be of the double-acting variety, or could consist of side-by-side, push-pull, single-acting cylinders. Either type of extension cylinders could be used in combination with sheaves and cables to provide even further extension. Those of skill in the art will appreciate that this three-stage boom can utilize the same outer boom length as disclosed in the '138 patented design, while permitting the same compact swing radius and enabling the handling of pallets or containers which are shorter than the hoist length, as well as pallets or containers which are much longer than could previously be handled (i.e., exceeding the current 24 foot maximum). It will also be appreciated that two booms or, alternatively, more than three booms can be utilized.

Referring to FIG. 2, a rear roller assembly, generally designated as 44, is provided on the rear of tilt frame 37 for guiding and supporting the container during loading and unloading, and for supporting railed containers with either "inside" or "outside" rails, as will be discussed below.

Attached to free end 38 of L-arm 24 is a hook 40 or other means to secure and hold a pallet or container (not shown). The open side of hook 40 faces forward toward cab 28 of recovery vehicle 26. This arrangement enables effective loading and unloading with various pallet types, and also permits dumping, as will be described.

Figure 4:
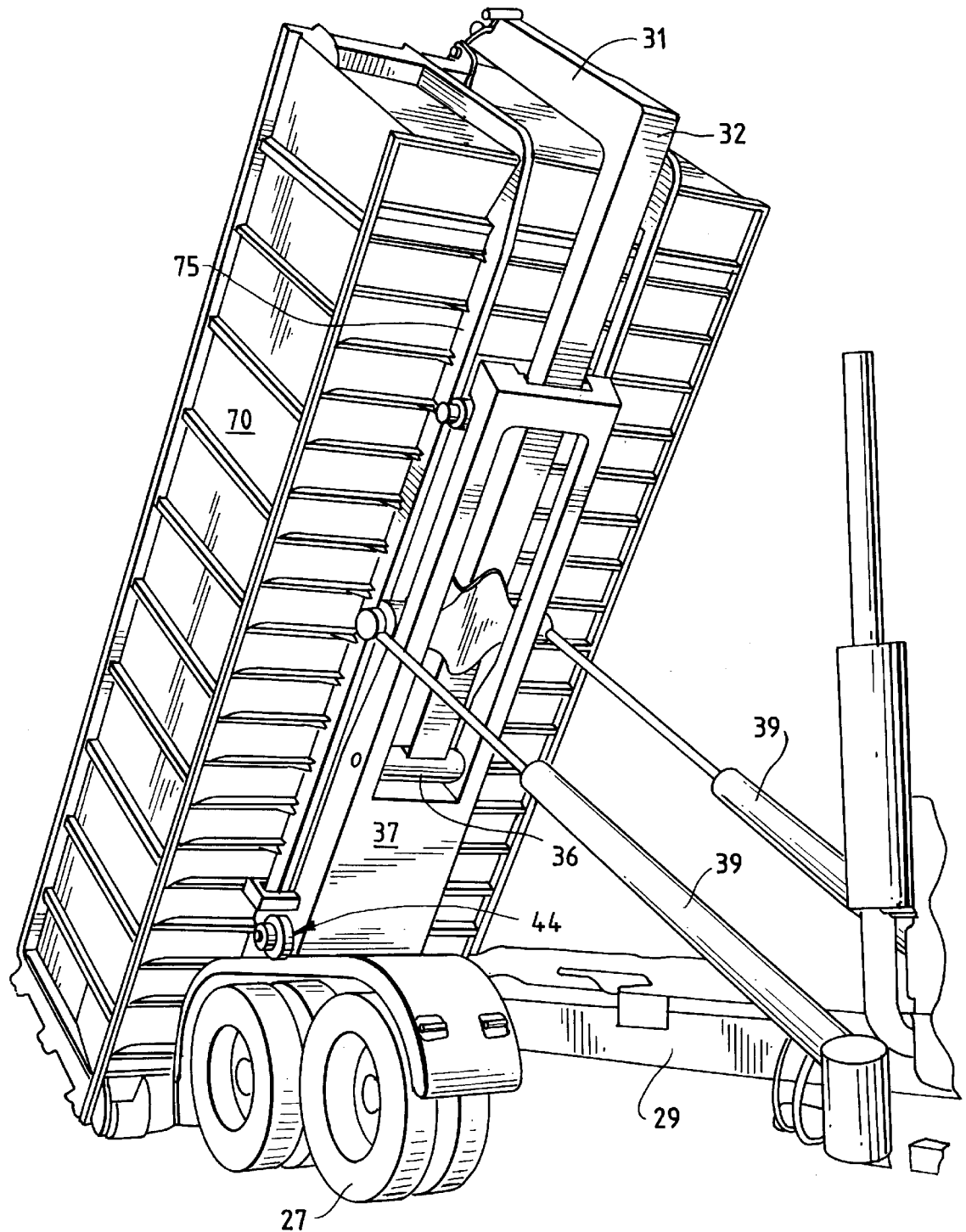
FIG. 4 is a view similar to FIG. 2 showing the loading apparatus in the fully extended dump mode.

The loading and recovery apparatus of the present invention can operate either in a dumping mode or in a pallet loading mode, in a manner similar to that disclosed in the '138 patent. Turning now to FIG. 4, the present invention is illustrated in the dump mode, simulating a dump truck. In this mode, tilt frame 37 is locked to intermediate boom 33 and inner boom 31, forming a brace preventing L-arm 34 from rotating about point 36. Therefore, when cylinder 39 is extended and retracted the entire structure of the tilt frame 37, outer boom 32, intermediate boom 33 and inner boom 31 all move in unison as a single structure. A stabilizing plate (disclosed in the '138 patent as stabilizing frame 23, though not shown here) can also be provided on the upper surface of outer boom 32 or intermediate boom 33 to provide a broad surface for receiving a pallet or container. The stabilizing plate and twin outboard cylinders 39 each assist tilt frame 37 to support a pallet or container when loaded.

Figure 18:
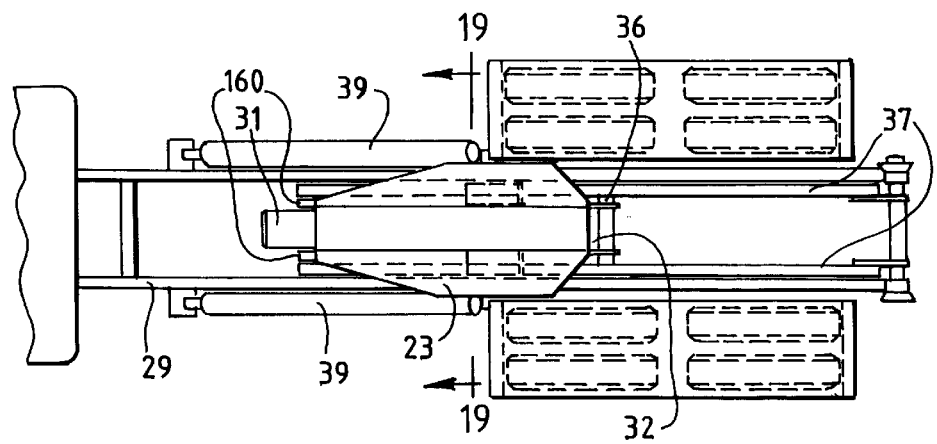
FIG. 18 is a top view of one embodiment of the loading apparatus of the present invention.
Figure 19:
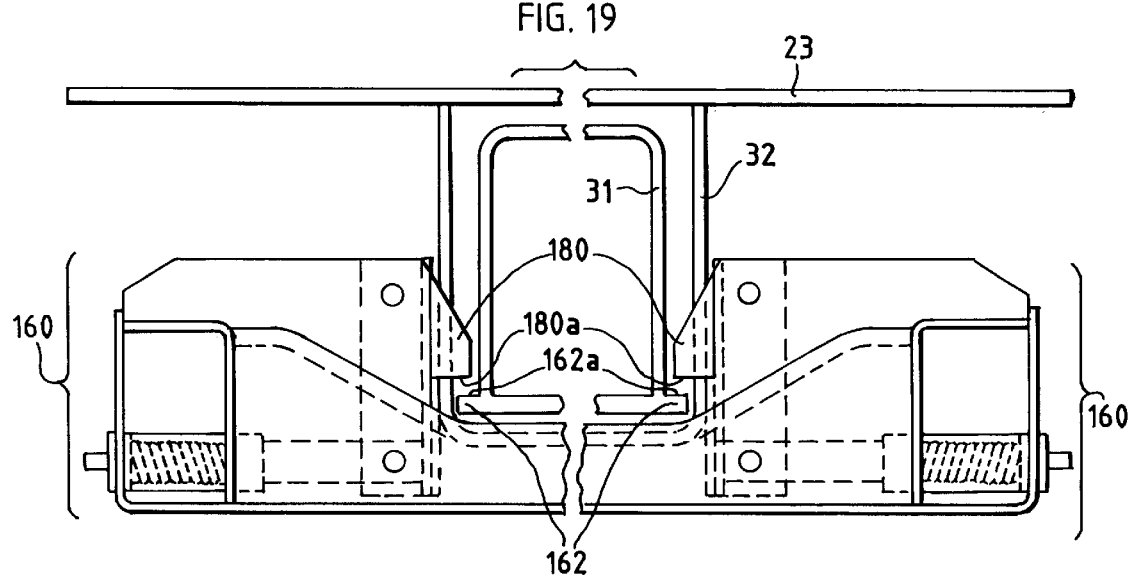
FIG. 19 is a cross-sectional view through line 19—19 of FIG. 18 of the locking means described in U.S. Pat. No. 5,290,138.

Referring now to FIGS. 18 and 19, locking mechanism 160 is engageable to lock tilt frame 37 and L-arm 34 together during their rotation, while unlocking them when inner boom 31 is fully retracted. (FIGS. 18 and 19 illustrate an embodiment utilizing a stabilizing frame 23 though this structure, of course, is not necessary.) Locking mechanisms 160 are positioned on both the lateral sides of inner boom 31. Each locking mechanism 160 is positioned on tilt frame 37 to be adjacent to only inner boom 31 and not outer boom 32. Referring now to FIG. 19, and as is apparent from the disclosure in the '138 patent, when angled bearing plate 180 is positioned over flange 162 and the operator attempts to pivot L-arm 34 by actuating cylinders 39, upper surface 162a of inner boom 31 will engage lower surface 180a of angled bearing plate 180. As a result, inner boom 31 will be locked to tilt frame 37 by locking mechanism 160. Therefore, actuation of cylinders 39, when the apparatus is in this position, will cause L-arm 34 and tilt frame 37 to pivot in unison, thereby causing operation in the dump mode.

A pallet or load on intermediate boom 33 and roller arrangement 44 and secured by hook 40 may be emptied in dump truck fashion while being supported by a stabilizing plate and twin outboard cylinders 39. The locking mechanism (not shown) disclosed in the '138 patent (see the description of locking mechanism 41 and FIGS. 6–8 of the '138 patent) can be used to allow tilt frame 37 to easily and simply support and brace L-arm 34 during rotation of L-arm 34 for dump mode loading or unloading.

The disclosed embodiment shown in the drawings is a "double pivot" loading and recovery apparatus which can also be used to load a pallet or container. In readying the apparatus for lifting, as shown in FIGS. 1 and 2, L-arm 34 is rotated rearwardly by lifting cylinders 39 to a certain point, due to the configuration of base 130 of L-arm 34 and its abutment against intermediate portion 135 of tilt frame 37. After this point, further rearward rotation of L-arm 34 (at least in the preferred embodiment shown in the drawings) can only be accomplished by the rearward rotation of tilt frame 37, as shown in FIG. 2.

Continuing with the pallet-loading recovery operation, cylinders 39 are now further actuated to further rotate L-arm 34 rearwardly and position hook 40 as low as possible for recovery of the pallet or container. It should be appreciated that once the pallet or container is secured to hook 40, the above-described process is executed in reverse order to effectuate loading of the pallet or container onto the bed of the vehicle.

Inside-Outside Rail Option

Rear roller assembly 44 is designed to support and smoothly guide a pallet or container, designated generally as 70, during the stages of loading, unloading and dumping. Roller assembly 44 of the present invention also permits the use of an apparatus that can pick up either "inside" or "outside" rail containers 70, while limiting side-to-side container body sway during handling. Referring now to FIGS. 5–8, in the preferred, disclosed embodiment, rear roller assembly 44 is located on the rear of tilt frame 37. Alternatively, roller assembly 44 can be located on the L-arm, vehicle chassis or hoist subframe, if it exists. Roller assembly 44 is rigidly secured to tilt frame 37, such as by shaft 58, which passes through the rear of tilt frame 37, and is secured by suitable means such as outside plate 54 and bolt 51. Outside moveable ring 46 can slide along roller cylinder 53, while an inside ring 48 on roller 53 remains stationary. Preferably, as shown, rings 46 and 48 are tapered at the ends, for better cooperation with container rails 75.

Figure 9:
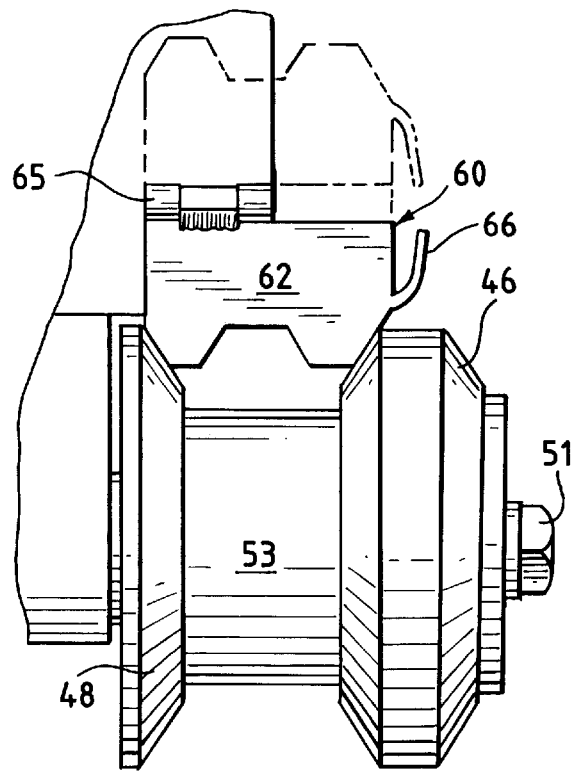
FIG. 9 is a planar view taken along section lines 9—9 of FIG. 2 showing one side of the rear roller assembly, including a moveable ring positioned in the inside rail option.
Figure 10:
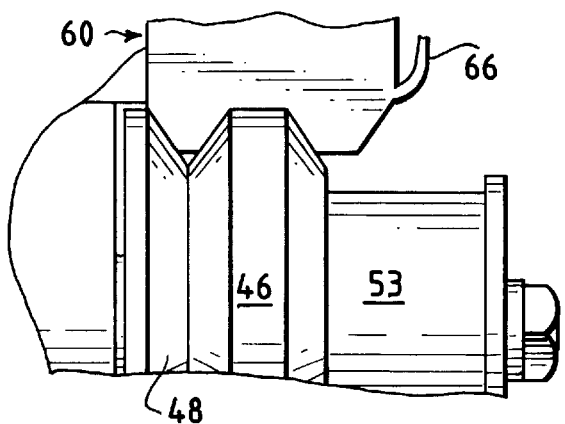
FIG. 10 is a view similar to FIG. 9 showing the moveable ring in the outside rail option.
Figure 11:
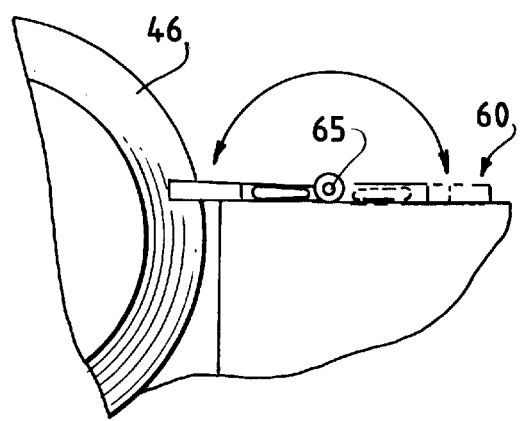
FIG. 11 is a partial side view of FIG. 9 illustrating the cam locking mechanism used to fix the moveable ring in position.

After moveable ring 46 has been manually slid into a desired position (though ring 46 could, of course, be moved by pneumatic or hydraulic cylinders or other means), cam locking mechanism 60, shown in FIGS. 9–11, is moved into place by manual rotation of lever arm 66. Now, arm 66 flips swivel plate 62 into place to fix moveable ring 46 into one of two stationary positions, for use with either "inside" or "outside" container rails, as shown in FIGS. 9 and 10, respectively. Thus, this rear roller assembly or "rail cooperation mechanism" 44 easily permits the engagement and handling of either "inside" or "outside" rail containers.

It will also be appreciated that the use of rings on roller cylinder 53 maintains the ability of roller assembly 44 to rotate during loading and unloading, when the container rails bear down on the roller. This is a superior design to the past use of simple guide plates with inside and outside gussets, in which steel scraped on steel or on wear pads.

Those of skill in the art will appreciate that various other alternative embodiments can be used to lock moveable ring 46. For example, with a loading and recovery apparatus having a different design than that disclosed here, it may be desirable to locate rail cooperation mechanism 44 on an L-arm, or on a different location of the tilt frame than disclosed here. As another non-limiting example, cam locking mechanism 60 or even ring 46 could be hydraulically powered. Further, swivel plate 62 could be positioned rearward of roller 53, and flip up from the rear (though it would act against gravity in this location). Note that container rail 75 must be able to pass over cam locking mechanism 60 without obstruction, so this fixes the height of cam locking mechanism 60. As still another alternative example, roller 53 could include a fixed intermediate cover plate (not shown) welded on the roller, and thereby further serving to fix the location of rail 75.

While a moveable ring 46 and a stationary ring 48 are preferably located on both sides of tilt frame 37, it is believed possible to use the inside/outside rail option with only one set of rings (preferably on the left side, within view of the driver's side mirror). This is not preferable, however, since it has been found that side-to-side sway or tilt of a container with respect to the chassis or tilt frame can be minimized using a rear roller assembly on each side of the tilt frame, as disclosed.

Of course, those of skill in the art will appreciate that two cooperating moveable rings or cylinders could be used instead of a cooperating pair of one stationary and one fixed ring, as described.

It will be understood by those of skill in the art, however, that other important features of the present invention limit container sway and improve the overally stability of the present invention in any dump or recovery mode, including the used of twin outboard-mounted cylinders, forward rollers, and an improved rear stabilizer.

Collapsible Bumper Option

Figure 12:
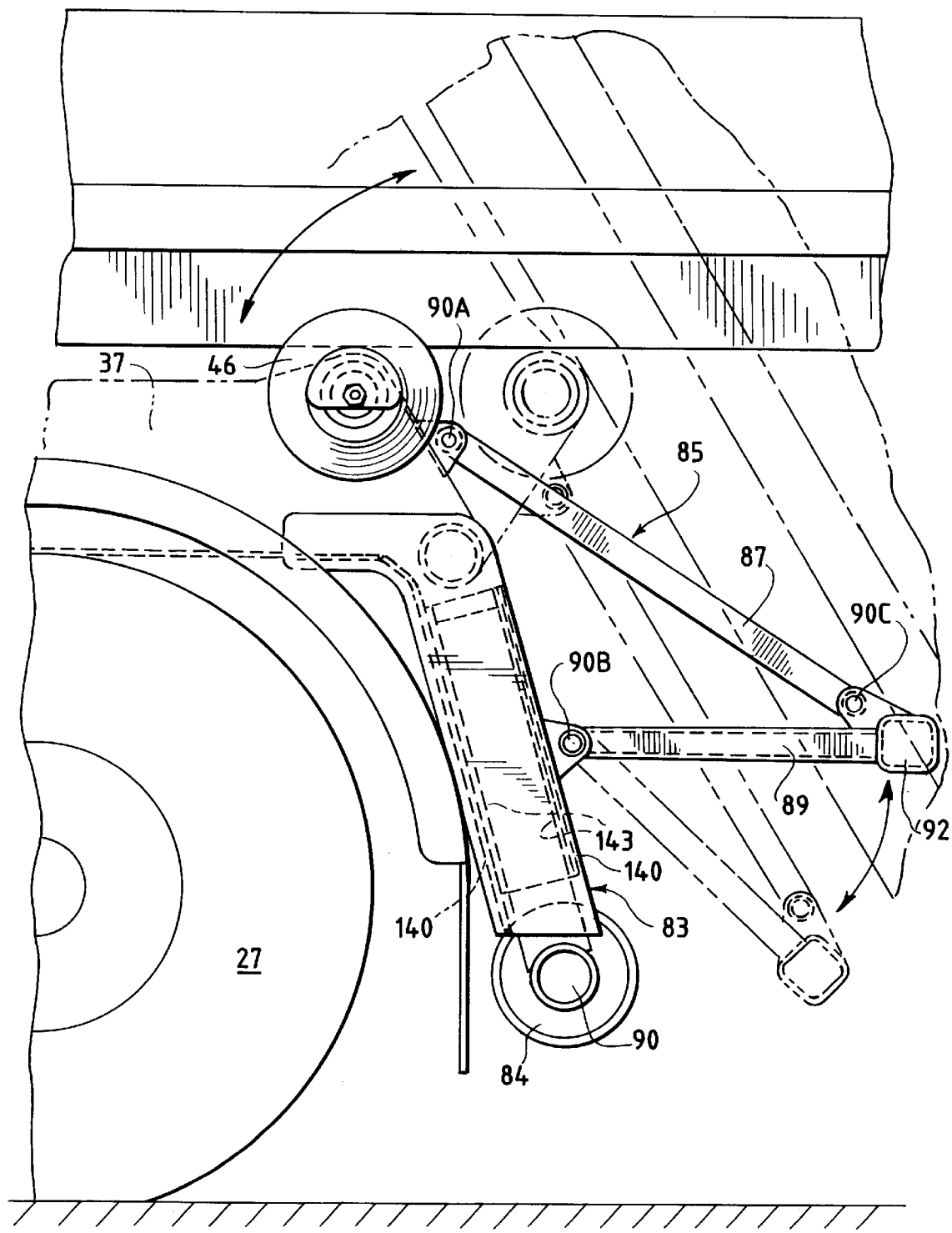
FIG. 12 is a side view taken along section lines 12—12 of FIG. 2 showing a rear portion of the chassis, including the extendable bumper and the rear stabilizer.
Figure 13:
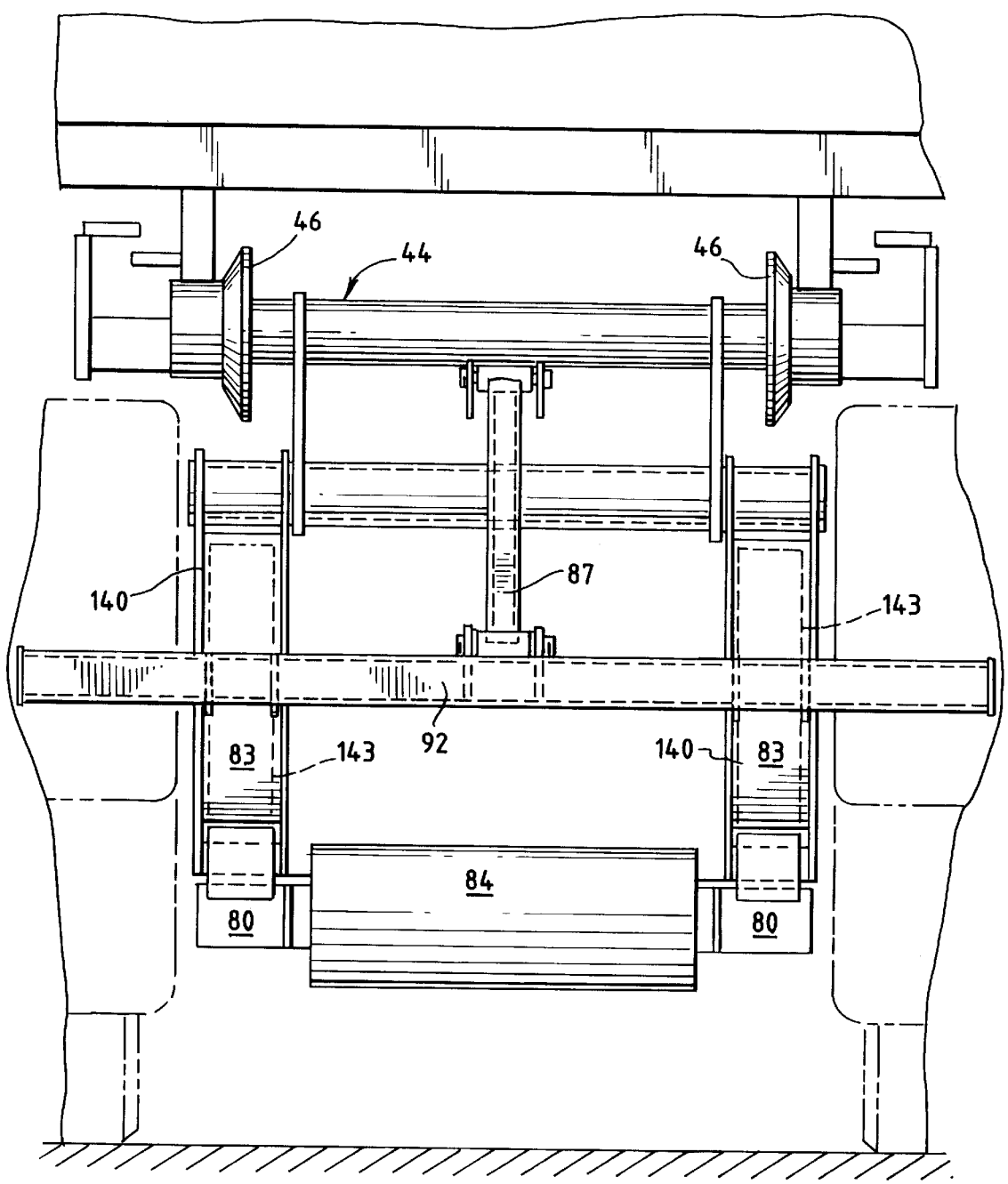
FIG. 13 is a rear view taken along section lines 13—13 of FIG. 2 showing various features including the rear roller assembly and outside rail option, the collapsible bumper and the stabilizer.

Another feature of the present invention is the use of a collapsible bumper which can form a rearward extension of the vehicle chassis. Referring now to FIG. 12, a collapsible bumper, designated generally as 85, extends rearwardly from tilt frame 37 and includes rearwardly extending link 87 and a transverse bumper rail 92. Link 87 is pivotally connected to tilt frame 37 at pivot 90A. Link 87 and bumper rail 92 are pivotally connected at pivot 90C. Twin support bars 89 are pivotally connected to a rear portion of rear stabilizer 83 at pivot 90B, below pivot 90A on tilt frame 37. Support bars 89 are also pivotally connected to bumper rail 92 (pivot point not shown).

Still referring to FIG. 12, bumper 85 is shown in a fully extended position. As tilt frame and L-arm 34 rotate rearwardly by actuating lift cylinders 39, bumper rail 85 (now shown in phantom) is collapsed. Since the movement of bumper rail 85 is contingent on the movement of tilt frame 37 in this embodiment, there is no need for bumper rail 85 to be separately powered. Alternatively, link 87 could be separately powered. Another advantage of the disclosed embodiment is that the bumper is collapsible at the appropriate time when the tilt frame is fully extended in the dump mode, and the bumper would otherwise act as an obstruction for the container, or for refuse sliding out of the rear of the container.

Forward Roller Option

Figure 3:
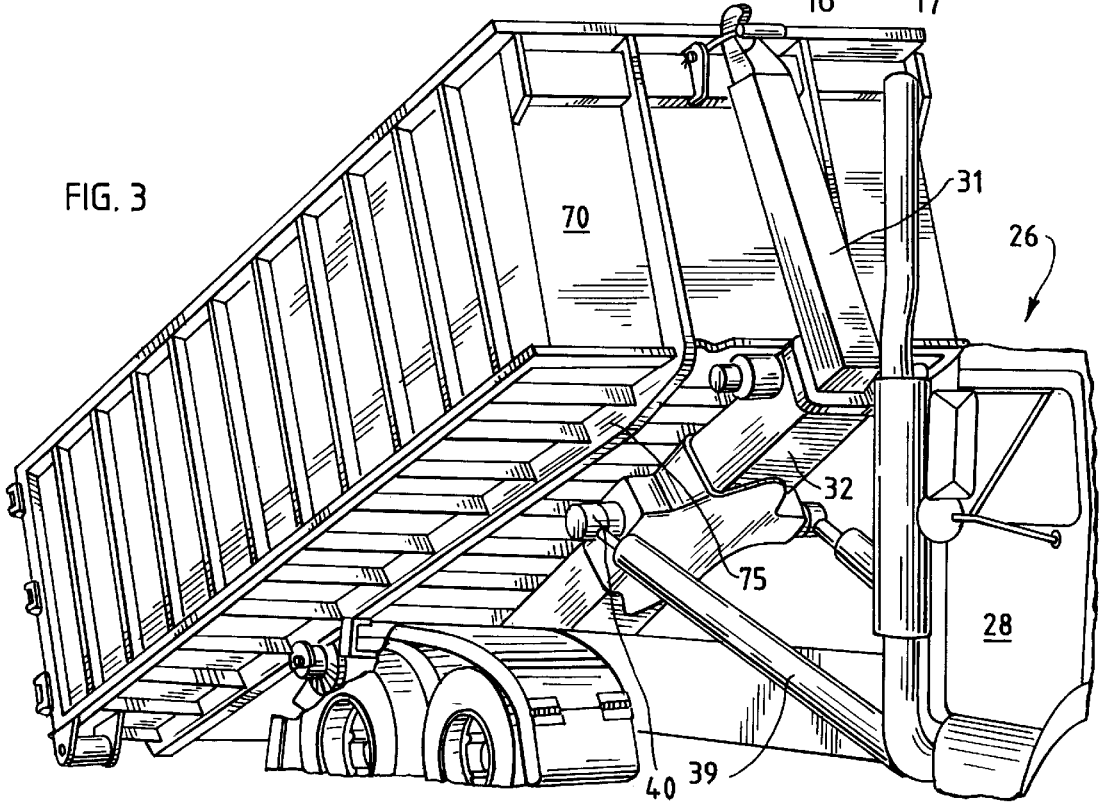
FIG. 3 is a partial front perspective view of the loading apparatus in a loading mode in which the L-arm is fully retracted and not locked to the tipping frame (not shown)

Another feature of the present invention is the use of forward rollers for enhanced stability and handling of containers, instead of the prior art use of steel slide pads, which wear easily. Referring to FIGS. 2 and 3, forward roller 105 is attached to outer boom 32 of L-arm 34. While an "outside rail" roller assembly can be used, an inside-outside roller assembly (not shown) is preferred. In this latter assembly, two sets of spaced rollers can be positioned on either side of the L-arm, to accommodate both "inside" and "outside" container rails. It has been found that these forward rollers handle narrow or misaligned container rails better than steel pads.

Another advantage of forward rollers 105 deals with enhanced weight distribution. The location of forward rollers 105 on L-arm 34 permits the forward weight of the container to be borne directly by outer boom 32, not tipping frame 37. This reduces stress in the tipping frame and allows it be made of a reduced weight and, therefore, a reduced cost.

A further advantage of forward rollers 105 is improved handling and stability. It has been found that rollers 105 remain in contact with the container during the load and dump cycles, and help to support the container as it is rotated forward onto the truck frame. With prior art steel pad systems, the container rails only come to rest on the pads when the hoist is fully collapsed.

Improved Rear Stabilizer Option

Figure 14:
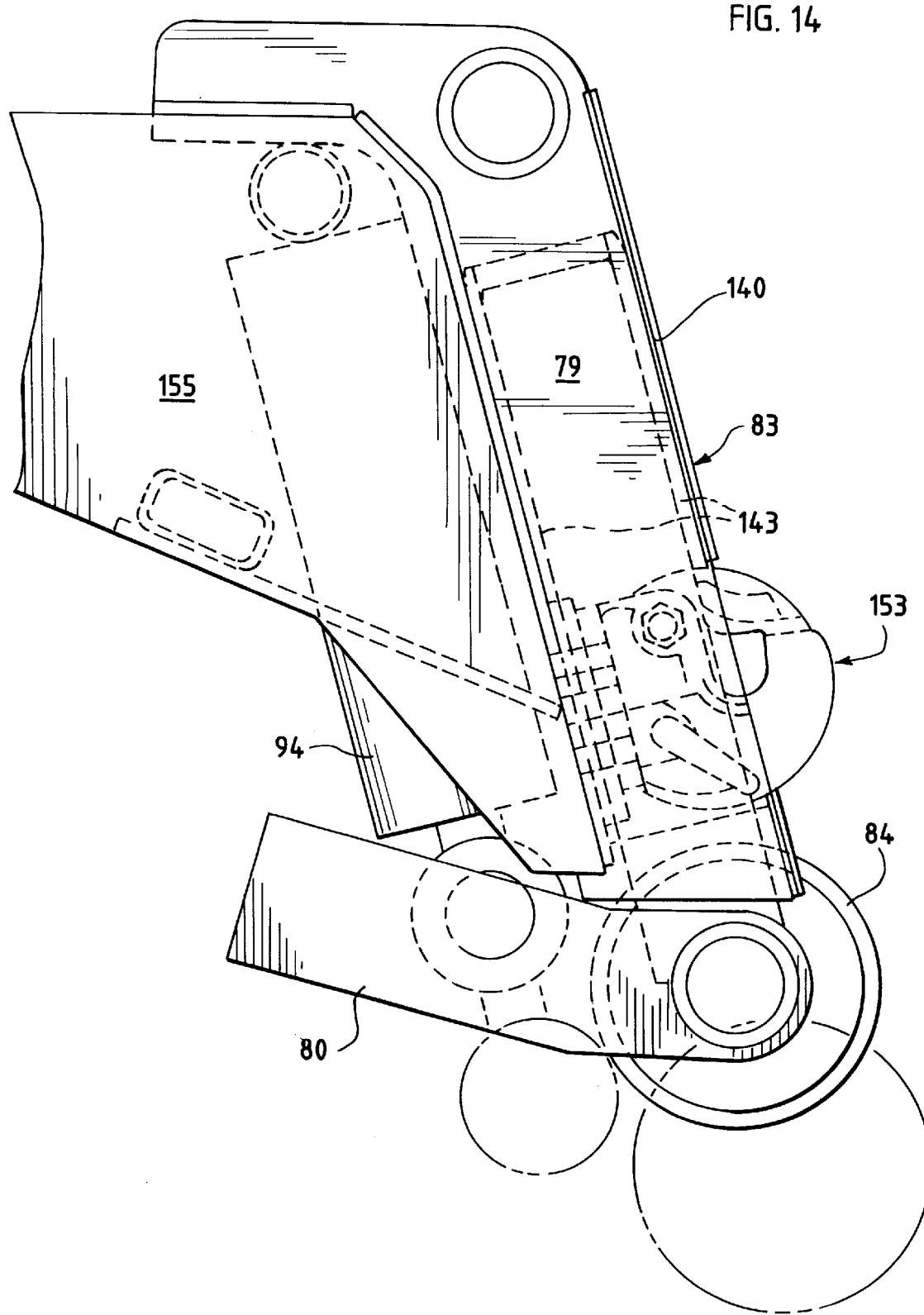
FIG. 14 is an exploded side view similar to FIG. 12 taken along section lines 14—14 of FIG. 2 and illustrating the rear stabilizer and the pintle hook.
Figure 16:
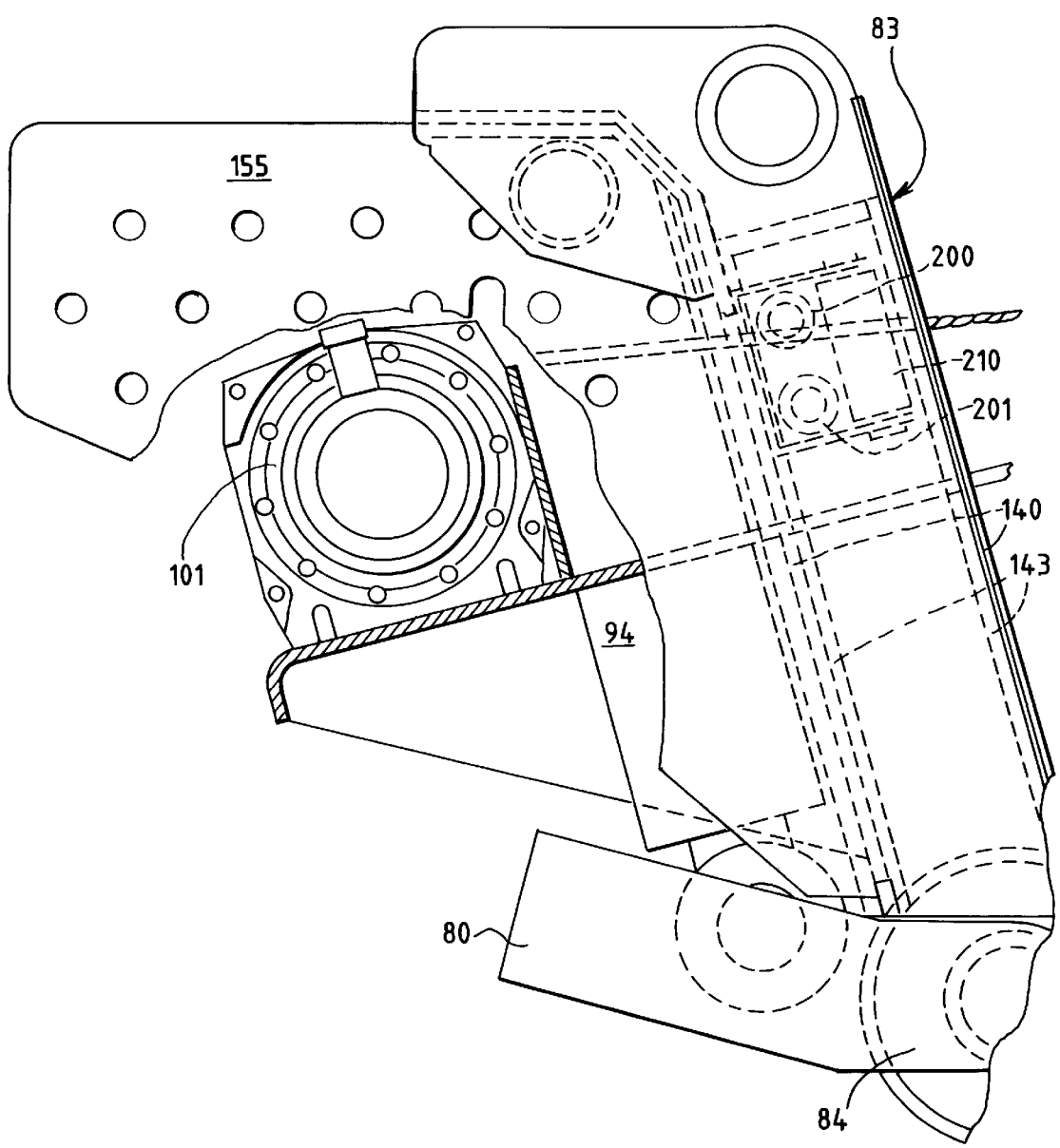
FIG. 16 is an exploded side view taken along section lines 16—16 of FIG. 2 and similar to FIG. 14, illustrating the connection of the upper portion of the rear stabilizer to the rear of the tilt frame, and also illustrating the rear-mounted hydraulic winch.

Another feature of the present invention is the use of an improved rear stabilizer for enhanced stability of the apparatus. Referring now to FIGS. 12, 13, 14 and 16, rear stabilizer 83 is shown. Stabilizer 83 is rigidly mounted to the vehicle chassis and includes main stabilizer arms 79, located on either side of tailboard 155. Each arm 79 terminates in a horizontal "foot" 80. As best shown in FIGS. 12, 14 and 16, stabilizer arms 79 preferably consist of large square outer tubes 140 which house square inner tubes 143. Inner tubes 143 slide within outer tubes 140 of main stabilizer arms 79. A rear portion of foot 80 is welded to inner tube 143, so that as hydraulic cylinder 94 is extended vertically downward, the downward pressure on foot 80 forces inner tubes 143 to slide downward within outer tubes 140, allowing the entire portion of each foot 80 to move downwardly, in the same plane as stabilizer arms 79, and without rotation of the foot (as occurs with prior art stabilizers). It will be understood that in a particular embodiment each hydraulic cylinder 94 on either side of tilt frame 37 could be operated independently of the other, permitting each foot 80 to be vertically movable independent of the other foot. Foot 80 terminates in a roller 84 for use on paved ground. Alternatively, roller 84 can be interchanged with a pronged bottom plate, shoe or toothed grouser (not shown) or other support for use on soft terrain.

Instead of rotating to the front or to the rear, as with past designs, foot 80 of improved rear stabilizer 83 extends and retracts almost vertically. Both extension hydraulic cylinder 94 and the angle of the stabilizer lock the stabilizer into position when it is used. (In the commercial embodiment, the departure angle is increased from approximately 15° to about 23°.) This stabilizer provides a more compact design with fewer moving parts and fewer pivot points, and with more vertical force applied directly to the ground than with previous designs. With this design, since the stabilizer is oriented in the same plane as the actuating cylinder (as shown in FIG. 14), the resulting "straight push" from the hydraulic cylinder translates into more force, while permitting the use of a lower cost, smaller cylinder. It has been found that this stabilizer permits heavier loading using the hoist than with previous designs.

Relocation of Tilt Frame Pivot Point An additional feature of the present invention is the location of the hinge point 37A of tilt frame 37. Hinge point 37A has been moved forward and downward from the hinge point of the tilt frame of the device disclosed in the '138 patent (compare FIGS. 2 and 12 of the present invention with FIG. 2 of the '138 patent). It was found that by thus relocating hinge point 37A, this also permitted an advantageous repositioning of lift cylinders 39. The important result is a significant increase in dumping capacity, since the effective moment arm of tilt frame 37 has been shortened, increasing the lifting power of cylinders 39. This optimizes both lifting and dumping capacities, since loading capacity is not sacrificed in any significant way.

Other Features

It will be appreciated that each of the various features of the present invention, including the inside-outside rail option, the collapsible bumper, the forward rollers, and the improved rear stabilizer, can be used with either the loading and recovery apparatus disclosed here, or the apparatus disclosed in the '138 patent, or with virtually any other known loading and recovery apparatus. Further, these apparatus and these features of the present invention can also be used with the rear winch and rear pintle hook features disclosed in the '138 patent, or the rear winch and rear pintle hook features now described.

Figure 15:
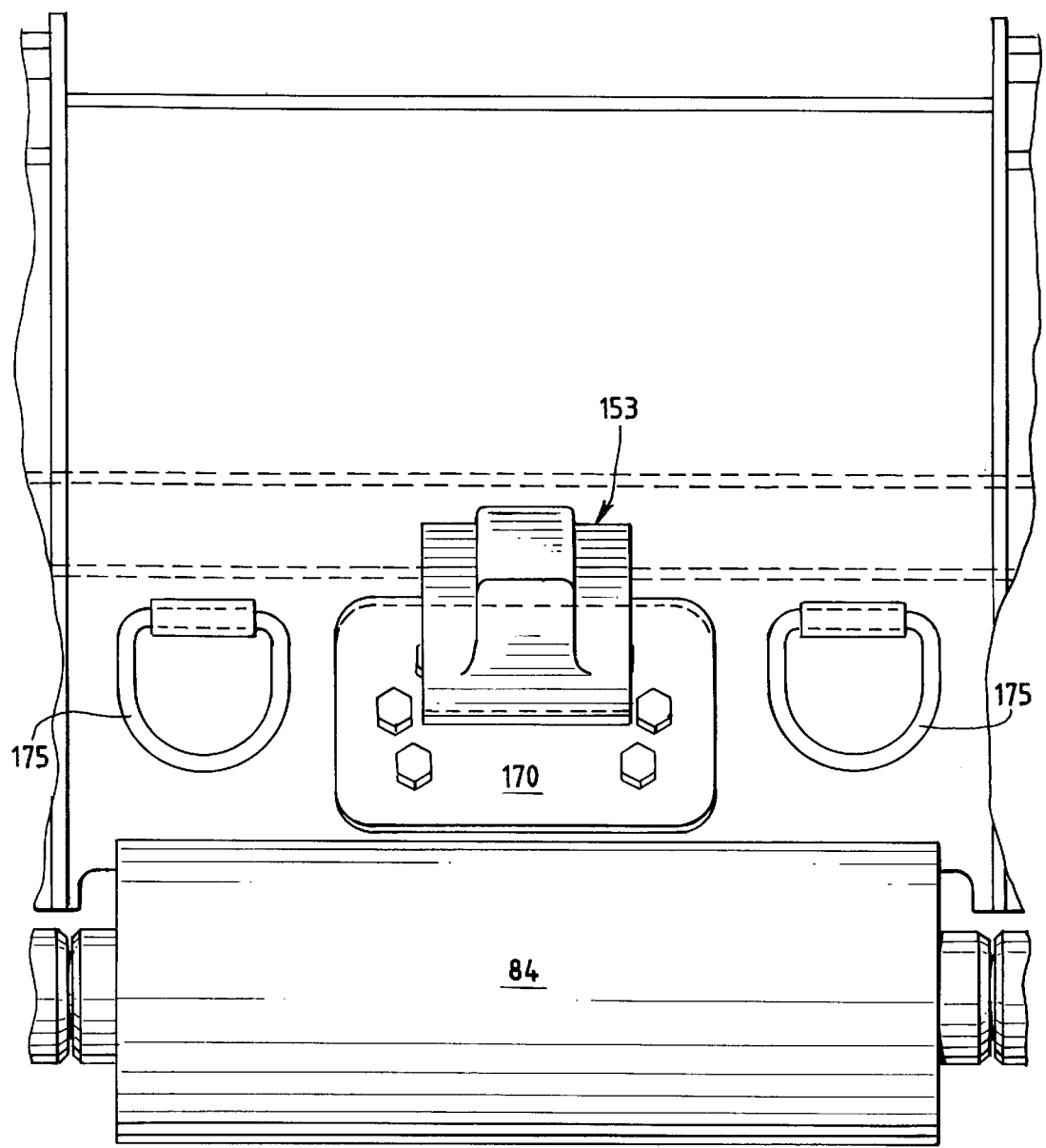
FIG. 15 is an exploded end view similar to FIG. 13 taken along section lines 15—15 of FIG. 2 and showing various rear components including the rear stabilizer.

Referring to FIGS. 14 and 15, pintle hook 150 is shown, and can be attached to a lower rear portion of rear tailboard 155 (not shown on the earlier drawings), which forms a portion of the rear of vehicle chassis 29. As those of skill in the art will understand, the C-clamp of the pintle hook is typically engaged with the yoke on a trailer, to pull the trailer behind a truck or other recovery vehicle.

Figure 17:
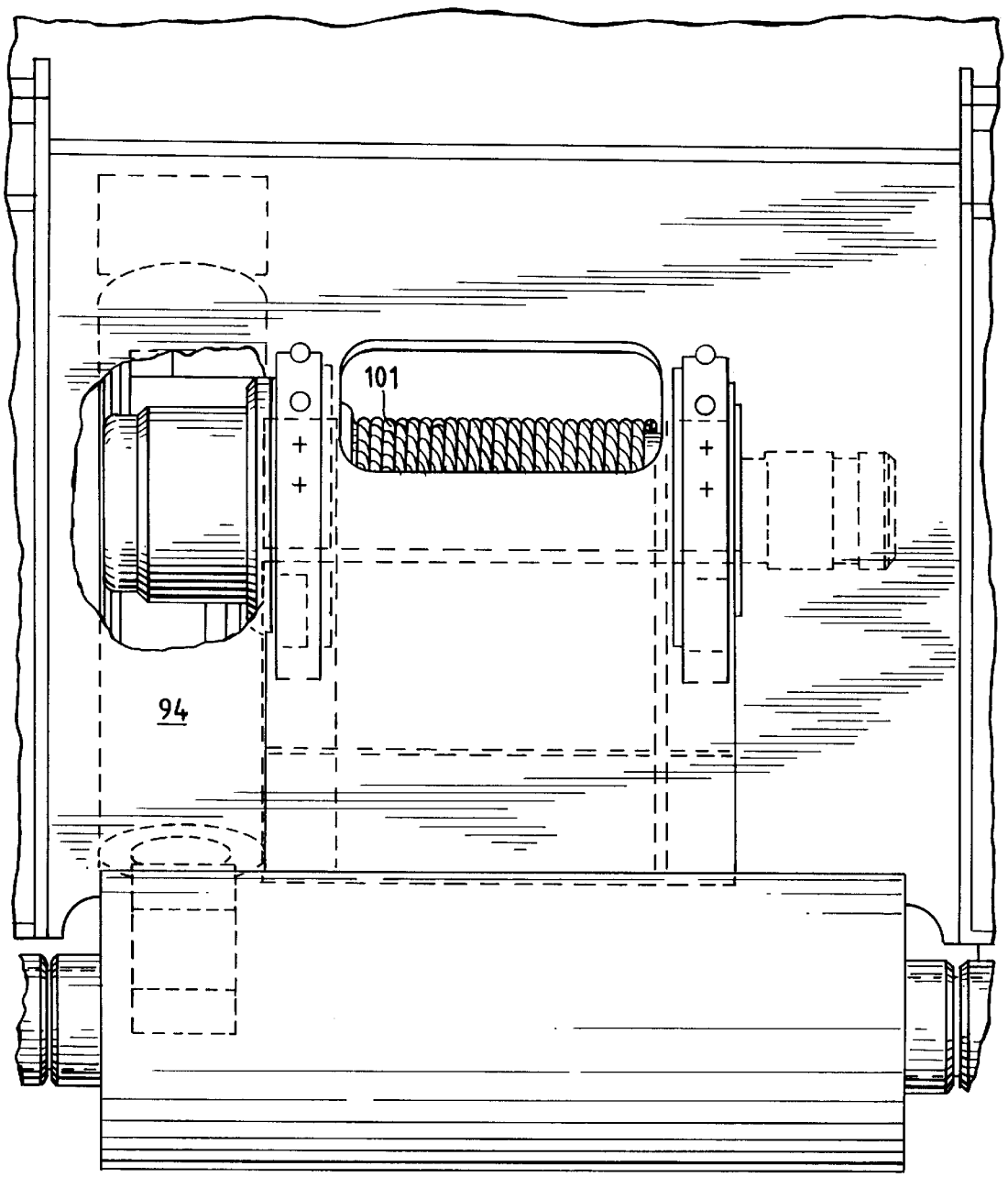
FIG. 17 is a rear view of the recovery apparatus taken along section lines 17—17 of FIG. 2 and including broken-out sections.

The present invention may also be used in conjunction with a winch. Winch 101 (also not shown in the earlier figures, to avoid complicating the drawings) is shown at FIGS. 16 and 17, and can be seen to be located to the side of cylinder 94. The winch is typically used in connection with a flat rack (not shown), so that (for example) machinery or heavy equipment can first be winched onto the flat rack prior to "recovery" onto the L-arm/tilt frame structure of the present invention. Referring to FIG. 16, two-way rollers 200 and 201, in conjunction with fairlead 210, can be used to prevent the cable on winch 101 from rubbing or scraping on raw metal, as will be understood by those of skill in the art. Alternatively, a four-way roller system (two sets of two-way rollers, positioned side-to-side, not shown) could be utilized instead of the combination of two-way rollers and a fairlead, to avoid up-and-down as well as side-to-side scraping of the cable on metal. This system could, of course, be used in conjunction with a winch.

Referring to FIG. 15, a rear portion of the apparatus of the present invention is shown, including rear mounting plate 170, which is bolted or otherwise securely attached to the rear of the vehicle chassis. Link 87 of collapsible bumper 85 is pivotally attached to rear mounting plate 185 and (if used) pintle hook 153, as are safety hooks 175.

Recovery vehicles used for mounting the loading and recovery apparatus of the present invention have an industry-standard chassis height in a range of approximately 39–43 inches. Also, the frame width is typically about three feet (34 inches) while the frame height is typically about one foot. Since the hoist apparatus must be mounted on the top of the chassis, this leaves an extremely narrow envelope for mounting other apparatus, including a winch, pintle hook, stabilizer, rear roller assembly, safety hooks, and bumper, to the rear of the vehicle frame. The present invention accomplishes this mounting within the confined space of the rear and lower vehicle chassis. The novelty of apparatus like the stabilizer and bumper of the present invention, therefore, must also be viewed in light of the limited space available to actuate these devices.

It will be understood that all of the various features of the loading and recovery apparatus of the present invention can be utilized on the rear end of a truck or other recovery device or, alternatively, on the rear of a trailer which can, in turn, be attached to the truck or other recovery device. "Recovery vehicle" as used here, then, shall mean any truck, trailer or other type of recovery device from which the loading and recovery apparatus of the present invention can be operably mounted.

It will also be understood that the loading and recovery apparatus of the present invention can be utilized to recover, load, unload or dump (each of these operations will be collectively referred to in the claims as "handling") any types of containers, bodies, or storage structures, including (without limitation): railed containers, garbage containers, flat racks, pallets, dump bodies, water tanks, propane tanks, diesel tanks, van bodies, salt spreaders, lube units, fire fighting apparatus, etc. All of these various structures will be deemed encompassed by the use of the term "container bodies" in the claims.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. A loading and recovery apparatus for handling railed container bodies, the apparatus being operable from a rearward end of a recovery vehicle having a wheeled chassis, comprising:

a longitudinally extending frame pivotally mounted to the chassis, the frame having opposed sides defining its width and an upper surface adapted to support the container bodies;

means for pivoting the frame positioned at a rearward location on the chassis;

a rail engaging mechanism mounted to the frame and adapted to engage the rails of container bodies, the rail engaging mechanism including at least one fixed supporting member extending transverse to and movable with the pivoting frame, and at least two rail retainers each rotataby mounted to the supporting member adjacent the opposed sides of the frame, with at least one of the retainers being slidably mounted in a direction generally transverse to the frame; and means for loading and unloading the container bodies from the upper surface of the frame;

wherein the rail engaging mechanism permits the apparatus to handle container bodies having rails of varying spacing, facilitates retention of the container bodies to the pivoting frame when the frame is positioned at varying angles of inclination, and cooperates with the frame to limit lateral movement of the container bodies during loading and unloading of the container bodies onto or off of the upper surface of the frame or during movement of the recovery vehicle.

2. The loading and recovery apparatus of claim 1, further comprising hydraulic actuators for pivotally moving the frame between raised and horizontal positions.

3. The loading and recovery apparatus of claim 1, further comprising one or more power actuators, and wherein the means for loading and unloading includes an extendable and retractable generally L-shaped arm pivotally connected to the frame and driven by the one or more power actuators.

4. The loading and recovery apparatus of claim 1, wherein two pairs of rail retainers are mounted to the at least one supporting member.

5. The loading and recovery apparatus of claim 1, further comprising a locking mechanism for fixing the at least one movably mounted retainer in a desired location relative to the supporting member.

6. The loading and recovery apparatus of claim 1, wherein the at least one supporting member comprises an axle.

7. The loading and recovery apparatus of claim 1, wherein the at least two rail retainers comprise metal rings.

8. The loading and recovery apparatus of claim 1, further comprising a winch mounted to the rear of the vehicle chassis.

9. The loading and recovery apparatus of claim 1, wherein the means for loading and unloading includes a pivoting lifting arm driven by one or more power actuators.

10. A loading and recovery apparatus for handling railed container bodies, the apparatus being operable from a rearward end of a recovery vehicle having a wheeled chassis, comprising:

a longitudinally extending frame pivotally mounted to the chassis, the frame having opposed sides defining its width and an upper surface adapted to support the container bodies;

at least one rail engaging mechanism mounted to the frame and adapted to engage the rails of container bodies, the rail engaging mechanism including at least one fixed supporting member extending transverse to and movable with the pivoting frame, and at least two rail retainers each rotatably mounted to the supporting member adjacent the opposed sides of the frame, with at least one of the retainers being mounted for slidable movement along the supporting member; and a pivoting lift arm connected at a rearward end of the recovery vehicle for loading and unloading the container bodies from the upper surface of the frame;

wherein the at least one rail engaging mechanism permits the apparatus to handle container bodies having rails of varying spacing, and cooperates with the frame to limit lateral movement of the container bodies during loading and unloading of the container bodies onto or off of the upper surface of the frame.

* * * * *